US012785109B2

(12) United States Patent
Korinek et al.

(10) Patent No.: US 12,785,109 B2
(45) Date of Patent: Nov. 3, 2026

(54) ACTIVE MATERIAL HAVING OXIDIZED FIBER ADDITIVE AND ELECTRODE AND BATTERY HAVING SAME

(71) Applicant: CPS Technology Holdings LLC, New York, NY (US)

(72) Inventors: Paul D. Korinek, West Bend, WI (US); Matthew A. Spence, Lindenhurst, IL (US); Melis Tunc Roesch, Pewaukee, WI (US)

(73) Assignee: CPS Technology Holdings LLC, New York, NY (US)

(*) Notice: Subject to any disclaimer, the term of this patent is extended or adjusted under 35 U.S.C. 154(b) by 853 days.

(21) Appl. No.: 17/764,115

(22) PCT Filed: Sep. 29, 2020

(86) PCT No.: PCT/US2020/053307
§ 371 (c)(1),
(2) Date: Mar. 25, 2022

(87) PCT Pub. No.: WO2021/067292
PCT Pub. Date: Apr. 8, 2021

(65) Prior Publication Data

US 2022/0407083 A1 Dec. 22, 2022

Related U.S. Application Data

(60) Provisional application No. 62/908,327, filed on Sep. 30, 2019.

(51) Int. Cl.
*H01M 4/73* (2006.01)
*H01M 4/583* (2010.01)
(Continued)

(52) U.S. Cl.
CPC ............. *H01M 4/73* (2013.01); *H01M 4/583* (2013.01); *H01M 4/662* (2013.01); *H01M 4/663* (2013.01); *H01M 2004/027* (2013.01)

(58) Field of Classification Search
CPC ........ H01M 4/73; H01M 4/583; H01M 4/662; H01M 4/663; H01M 2004/027
(Continued)

(56) References Cited

U.S. PATENT DOCUMENTS 5,223,352 A 6/1993 Pitts et al.
2007/0160910 A1* 7/2007 Sugie ...................... H01M 4/16 429/211
(Continued)

FOREIGN PATENT DOCUMENTS

CN 102782905 A 11/2012
CN 107431195 A 12/2017
(Continued)

OTHER PUBLICATIONS

English Translation of JP WO2014087473 A1 (Year: 2025).*
(Continued)

*Primary Examiner* — Osei K Amponsah
*Assistant Examiner* — Kevin Nguyen
(74) *Attorney, Agent, or Firm* — Boardman & Clark LLP

(57) ABSTRACT

A lead-acid battery is disclosed. The battery comprises a container with a cover having one or more compartments. One or more cell elements are provided in the one or more compartments. The cell elements comprise a positive electrode and a negative electrode. The positive electrode has a positive current collector and a positive electrochemically active material in contact therewith. The negative electrode has a negative current collector and a negative electrochemically active material in contact therewith. At least one of the positive electrochemically active material or the negative
(Continued)

electrochemically active material includes electrochemically active fibers dispersed therein. Electrolyte is provided within the container. One or more terminal posts extend from the container or the cover and are electrically coupled to the cell elements. An electrode and an active material for a lead-acid battery are also disclosed.

16 Claims, 17 Drawing Sheets

(51) Int. Cl.
*H01M 4/66* (2006.01)
*H01M 4/02* (2006.01)

(58) Field of Classification Search
USPC .......................................................... 429/521
See application file for complete search history.

(56) References Cited

U.S. PATENT DOCUMENTS

| | | | | |
|---|---|---|---|---|
| 2013/0004842 | A1* | 1/2013 | Abrahamson ......... | H01M 4/663 429/204 |
| 2015/0064538 | A1 | 3/2015 | Bosnyak | |
| 2018/0062164 | A1 | 3/2018 | Yamashita | |
| 2018/0138501 | A1* | 5/2018 | Ho ........................ | H01M 4/662 |

FOREIGN PATENT DOCUMENTS

| | | | | |
|---|---|---|---|---|
| CN | 108493448 | A * | 9/2018 | ............ H01M 10/06 |
| EP | 0551227 | A1 | 7/1993 | |
| JP | WO2014087473 | A1 * | 1/2017 | .............. H01M 4/20 |
| WO | 2016032126 | A1 | 3/2016 | |

OTHER PUBLICATIONS

International Search Report and Written Opinion for PCT/US2020/053307, mailed Dec. 21, 2020.
R J Ball et al, "Effect of valve regulated lead/acid battery positive paste carbon fibre additive" Journal of Materials Science, vol. 38, Jul. 2003, pp. 3013-3017.
Lach Jakub et al, "Applications of carbon in lead-acid batteries: a review" Journal of Solid State Electrochemistry, Springer, Berlin, DE, vol. 23, No. 3, Jan. 10, 2019, pp. 693-705.
Patrick T. Moseley et al. "Understanding the functions of carbon in negative active-mass of the lead-acid battery: a review of the progress" Journal of Energy Storage, vol. 19, Oct. 2018, pp. 272-290.
Kirchev A. et al: "Carbon honeycomb grids for advanced lead-acid batteries. Part II: Operation of the negative plates", Journal of Power Sources Elsevier B.V, Amsterdam, NL, vol. 279, Jan. 6, 2015 (Jan. 6, 2015), pp. 809-824, XP029220738, ISSN: 0378-7753, DOI: 10.1016/J.JPOWSOUR.2015.01.028.

* cited by examiner

*Individual standard deviations are used to calculate the intervals.*

ACTIVE MATERIAL HAVING OXIDIZED FIBER ADDITIVE AND ELECTRODE AND BATTERY HAVING SAME

CROSS-REFERENCE TO RELATED APPLICATIONS

This application is a national stage entry of International Application PCT/2020/053307, entitled "ACTIVE MATERIAL HAVING OXIDIZED FIBER ADDITIVE & ELECTRODE AND BATTERY HAVING SAME", filed Sep. 29, 2020, which claims priority from U.S. Provisional Patent Application, Ser. No. 62/908,327 filed Sep. 30, 2019, entitled "ACTIVE MATERIAL HAVING OXIDIZED FIBER ADDITIVE & ELECTRODE AND BATTERY HAVING SAME", the entire contents of which are hereby incorporated by reference herein in their entirety.

BACKGROUND

The present disclosure relates to the field of batteries. The present disclosure more specifically relates to the field of lead-acid batteries.

Lead-acid batteries are known. Lead-acid batteries are generally made up of plates of lead and separate plates of lead dioxide, which are submerged into an electrolyte or acid solution. The lead, lead dioxide and electrolyte provide a chemical means of storing electrical energy which can perform useful work when the terminals of a battery are connected to an external circuit. The plates of lead, lead dioxide and electrolyte, together with a battery separator, are contained within a housing of a polypropylene material.

Start-stop vehicles can place various demands on a lead-acid battery. Vehicles also are increasing in the electrical load of components, for which the electrical load must be supported through a stop event. Vehicle manufacturers are seeking a cost effective, reliable energy storage solution that ensures a seamless customer experience. Therefore, there is a need for consistent reliable performance from a lead-acid battery. There is also a need for a robust battery which can support additional prolonged/intermittent loads and support optimal duration and frequency of stop events. To this end, a need exists for a lead-acid battery which provides sustainable and fast rechargeability (e.g., improved charge acceptance) and consistent cycling performance. Accordingly, a need exists for a lead-acid battery with improved performance over existing devices.

SUMMARY

A lead-acid storage battery is disclosed which has improved performance.

More specifically, a lead-acid battery is disclosed which has a container with a cover and includes one or more compartments. One or more cell elements are provided in the one or more compartments. The one or more cell elements comprise a positive electrode, the positive electrode having a positive collector and a positive electrochemically active material in contact with the positive current collector; a negative electrode, the negative electrode having a negative current collector and a negative active material in contact with the negative current collector. At least one of the electrode active materials is provided with an electrochemically active fiber material dispersed in the active material. Electrolyte is provided within the container. One or more terminal posts extend from the container or the cover and are electrically coupled to the one or more cell elements. In some examples, one of the electrodes may comprise, in lieu of a punched, cast, or expanded metal grid, for example, a cured carbon or carbonized fiber mat. The cured carbon or carbonized fiber mat may be impregnated with the negative active material having electrochemically active fiber material.

A lead-acid battery is also disclosed which comprises an electrode having active material and a chopped electrochemically active fiber dispersed in the active material.

An electrode for a lead-acid battery is also provided. The electrode includes electrochemically active fiber dispersed in active material which is carried by the electrode. The electrochemically active fiber may be a chopped electrochemically active fiber. The fiber may further be an oxidized carbon fiber. The electrode may be a negative electrode and the active material may be negative active material. The electrode may also comprise a cured carbon or carbonized fiber mat current collector impregnated with the electrochemically active material and a frame member composed of a lead-calcium alloy.

An electrochemically active material for a lead-acid battery is also disclosed. The active material comprises a leady oxide and an electrochemically active fiber dispersed in the leady oxide.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a battery 100 is disclosed, and in particular a rechargeable battery, such as, for example, a lead-acid battery. Various embodiments of lead-acid storage batteries may be either sealed (e.g., maintenance-free) or unsealed (e.g., wet). While specific examples are described and illustrated, the battery 100 may be any secondary battery suitable for the purposes provided.

Figure 1:
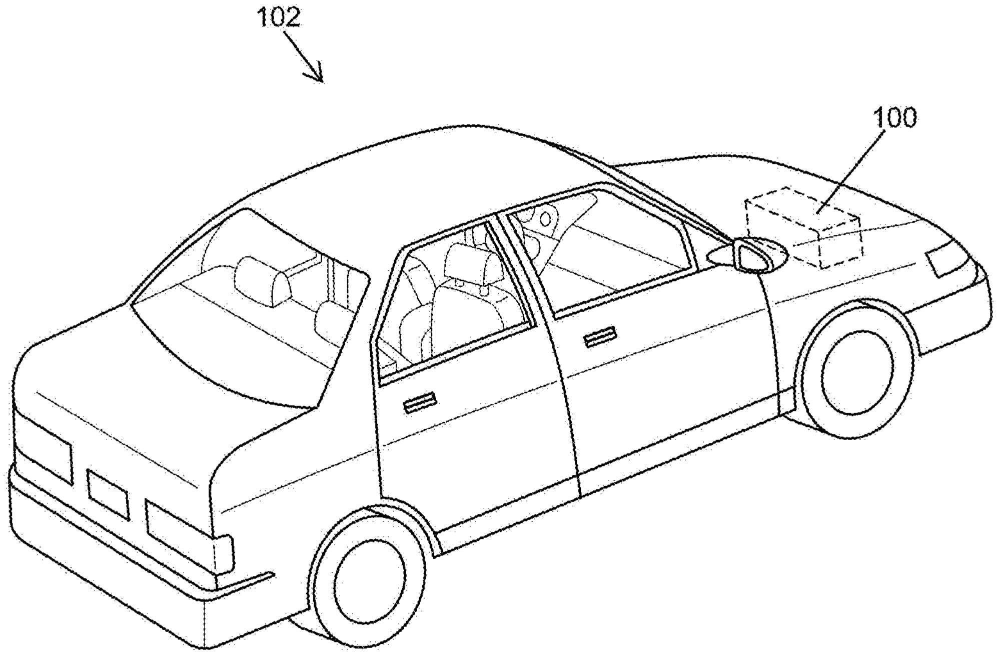
FIG. 1 is a perspective view of a vehicle for use with a lead-acid battery according to one or more examples of embodiments described herein.
Figure 2:
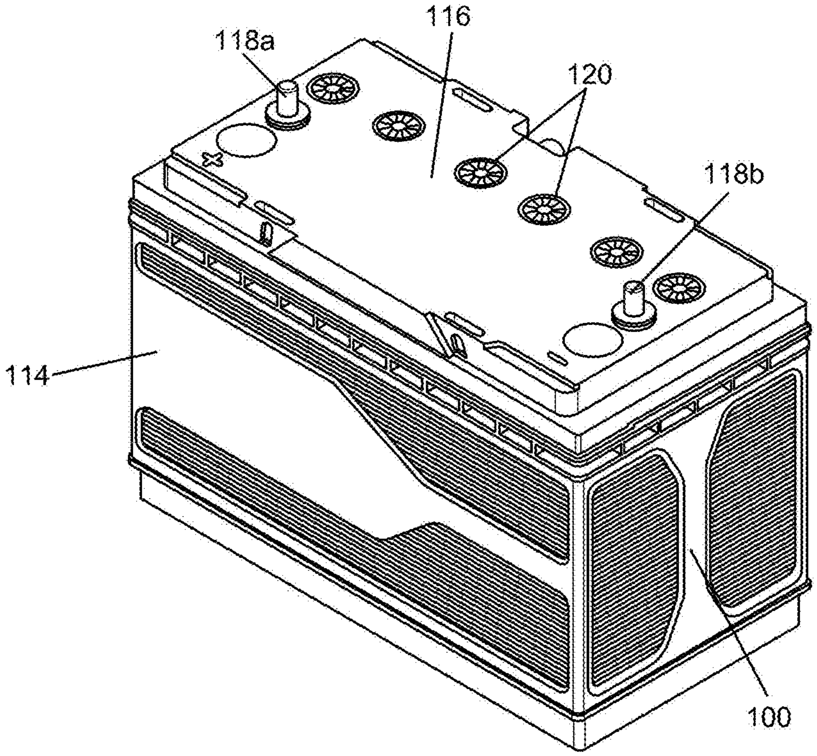
FIG. 2 is a perspective view of a lead-acid battery according to one or more examples of embodiments described herein.
Figure 3:
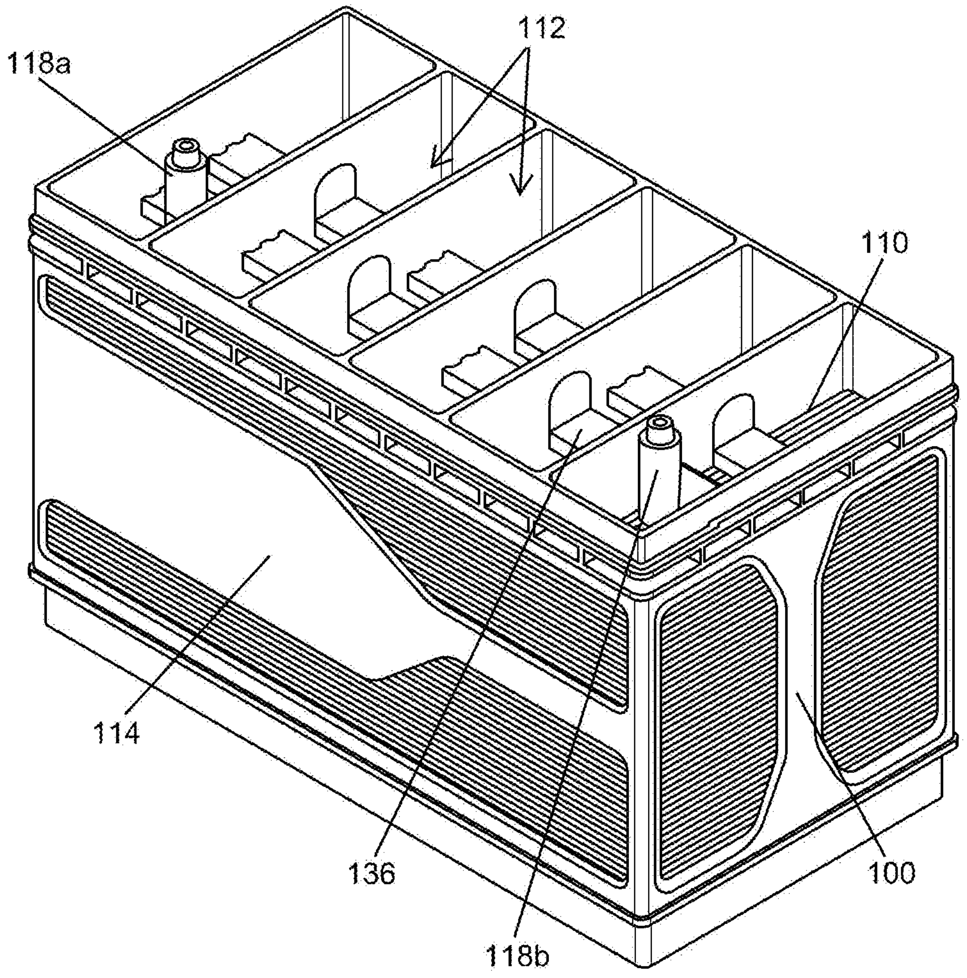
FIG. 3 is a perspective view of the lead-acid battery shown in FIG. 2, with the cover removed.
Figure 4:
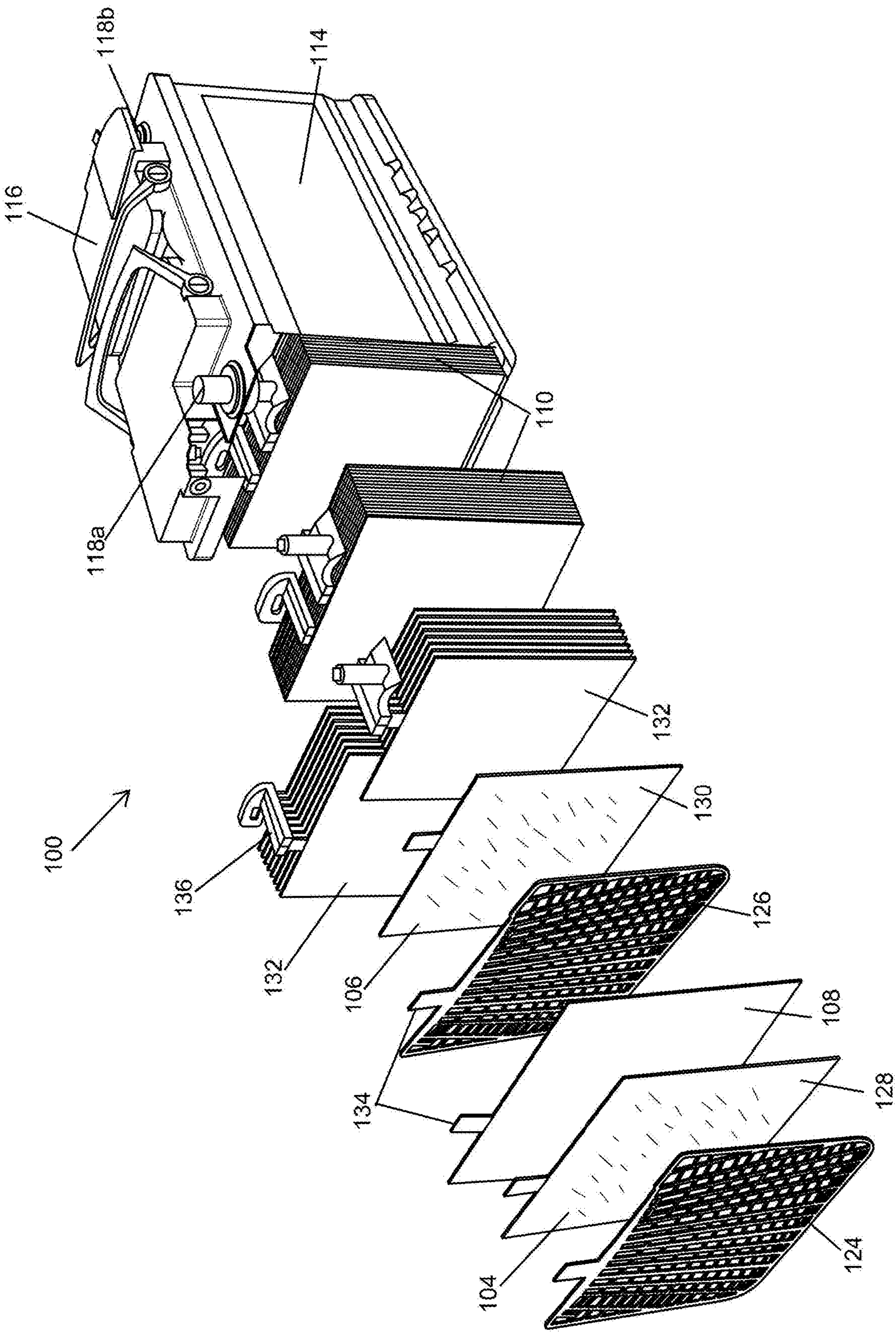
FIG. 4 is an exploded perspective view of a lead-acid battery according to one or more examples of embodiments described herein.

One example of a battery 100 is provided and shown in a vehicle 102 in FIG. 1. While a vehicle battery is shown and described, the disclosure and system described herein are not limited thereto. The battery 100 may be any type of lead-acid battery, including for example, industrial or back-up batteries, as well as other types of lead-acid batteries. Referring to FIGS. 2-4, the battery 100 is a lead-acid battery. The lead-acid battery 100 is composed of a housing 114 or container which includes a cover 116. Cover 116 is provided for the container or housing 114 and may be sealed to the container 114. In various embodiments, the container 114 and/or cover 116 includes battery terminals 118*a, b*. The battery cover 116 may also include one or more filler hole caps and/or vent assemblies 120 (see FIG. 2). The housing 114 and cover 116 may be primarily composed of a polymer material. In one or more examples of embodiments, the polymer material may be a recycled polymer material. An electrolyte, which typically comprises sulfuric acid, may be included in the battery 100 within the housing 114.

Within the container 114 are positive and negative electrodes or plates 104, 106. Referring to FIG. 4, the electrodes 104, 106 include electrically conductive positive or negative current collectors or substrates or grids 124, 126 or current collector 1001 as discussed in further detail herein. To this end, a “grid” or “current collector” may include any type of mechanical or physical support or substrate for the active material. Positive paste or electrochemically active material 128 is provided in contact with and/or on the positive grid 124 and negative paste or electrochemically active material 130 is provided on the negative grid 126. Positioned between the positive and negative electrodes or plates 104, 106 is a separator 108. In a retained electrolyte-type battery 100, the separator 108 may be a porous and absorbent glass mat (AGM). In one or more examples of embodiments, the lead-acid battery herein may be an AGM lead-acid battery.

A plurality of positive electrodes or plates 104 and a plurality of negative electrodes or plates 106 (with separators 108) generally make up at least a portion of the electrochemical cell 110 (see FIGS. 3-4). Referring to FIGS. 3-4, a plurality of plate or electrode sets or books or cell elements 110 may be electrically connected, e.g., electrically coupled in series or other configuration, according to the capacity of the lead-acid storage battery 100. The plurality of positive electrodes or plates 104 and negative electrodes or plates 106 may be provided in stacks or sets or cell elements 110 for producing a battery having a predetermined voltage, as one example a 12-volt battery in a vehicle 102. The number of cell elements 110 or groups or sets may be varied. It will also be obvious to those skilled in the art after reading this specification that the size and number of electrodes 104 and/or 106 in any particular group (including the size and number of the individual current collectors), and the number of groups used to construct the battery 100 may vary depending upon the desired end use. In an AGM lead-acid battery 100 which includes several cell elements 110 provided in one or more separate compartments 112 of a container or housing 114, the element stack 110 may be compressed during insertion reducing the thickness of the separator 108.

Each current collector has a lug 134 (see FIG. 4). In FIGS. 3-4, one or more cast-on straps or intercell connectors 136 are provided which electrically couple the lugs 134 of like polarity in an electrode or plate set or cell element 110 and to connect other respective sets or cell elements 110 in the battery 100. The connection of the elements may be a single element, parallel connection (capacity doubled, voltage the same) or series connection (e.g., voltages are additive, i.e., 4V, 6V, etc., with the same capacity). One or more positive terminal posts 118*a* and one or more negative terminal posts 118*b* (FIGS. 2-4) may also be provided, electrically coupled to the cell elements 110. Such terminal posts 118*a, b* typically include portions which may extend through the cover and/or container wall, depending upon the battery design. It will be recognized that a variety of terminal arrangements are possible, including top, side, front or corner configurations known in the art. The intercell connectors 136 and/or terminals 118*a, b* may be composed of lead or lead alloy. In one or more examples the lead may be a recycled lead.

As described and referring to FIGS. 4-8, the electrodes 104, 106 include electrically conductive positive or negative current collectors or substrates or grids 124, 126. In one or more examples of embodiments, the positive grid or current collector or substrate 124 and/or the negative grid or current collector or substrate 126 may be composed of lead or lead alloy, which in some examples of embodiments may be or include a recycled lead.

Figure 9:
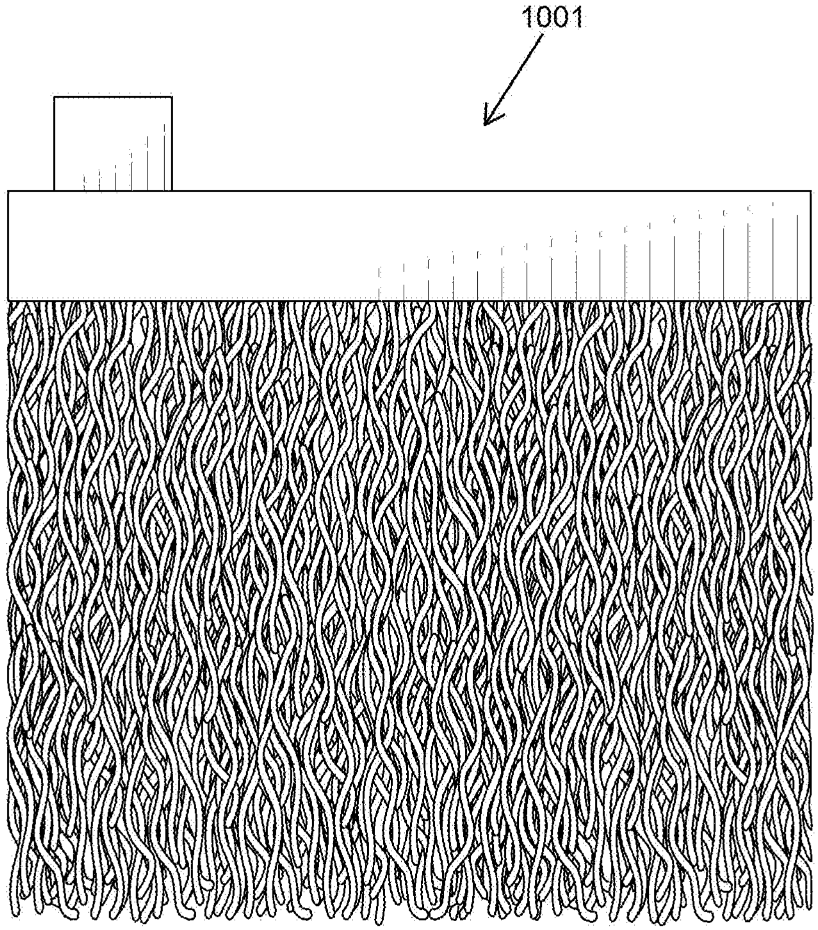
FIG. 9 is a current collector or substrate for use with the lead-acid battery described herein, showing example fibers in exaggerated dimensions for purposes of illustration.
Figure 10:
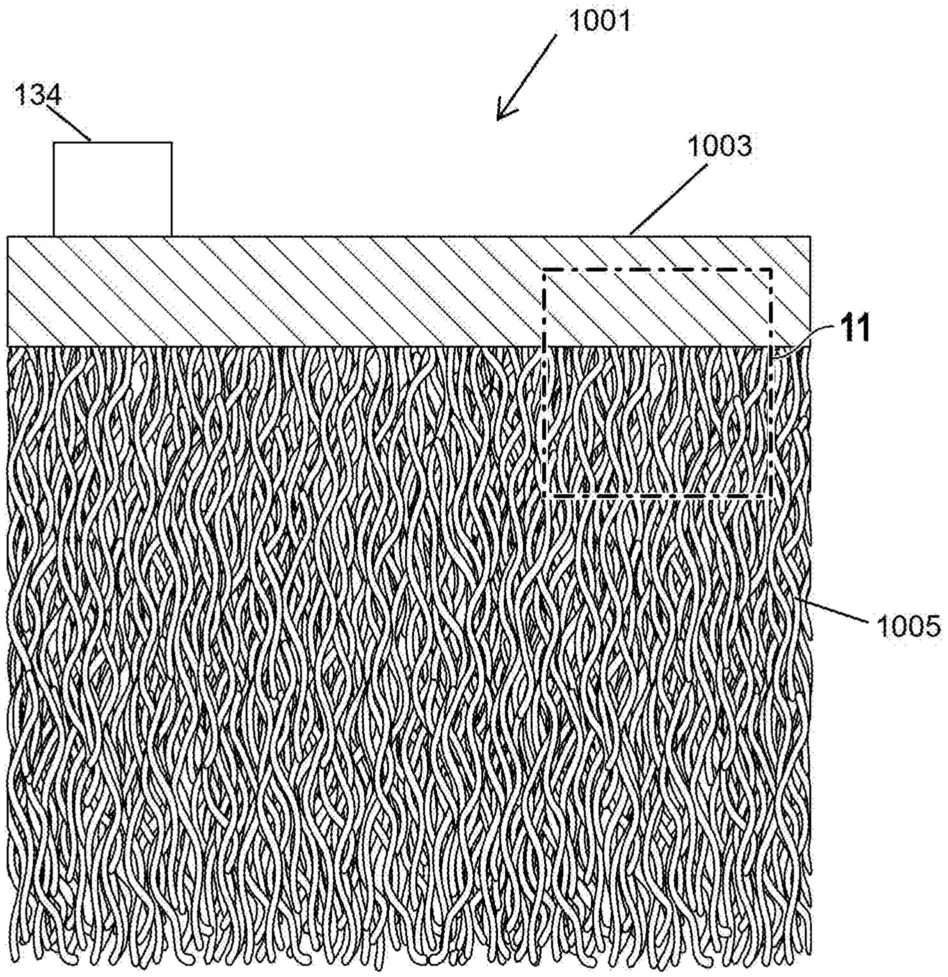
FIG. 10 is another view of a current collector or substrate of FIG. 9 for use with the lead-acid battery.
Figure 11:
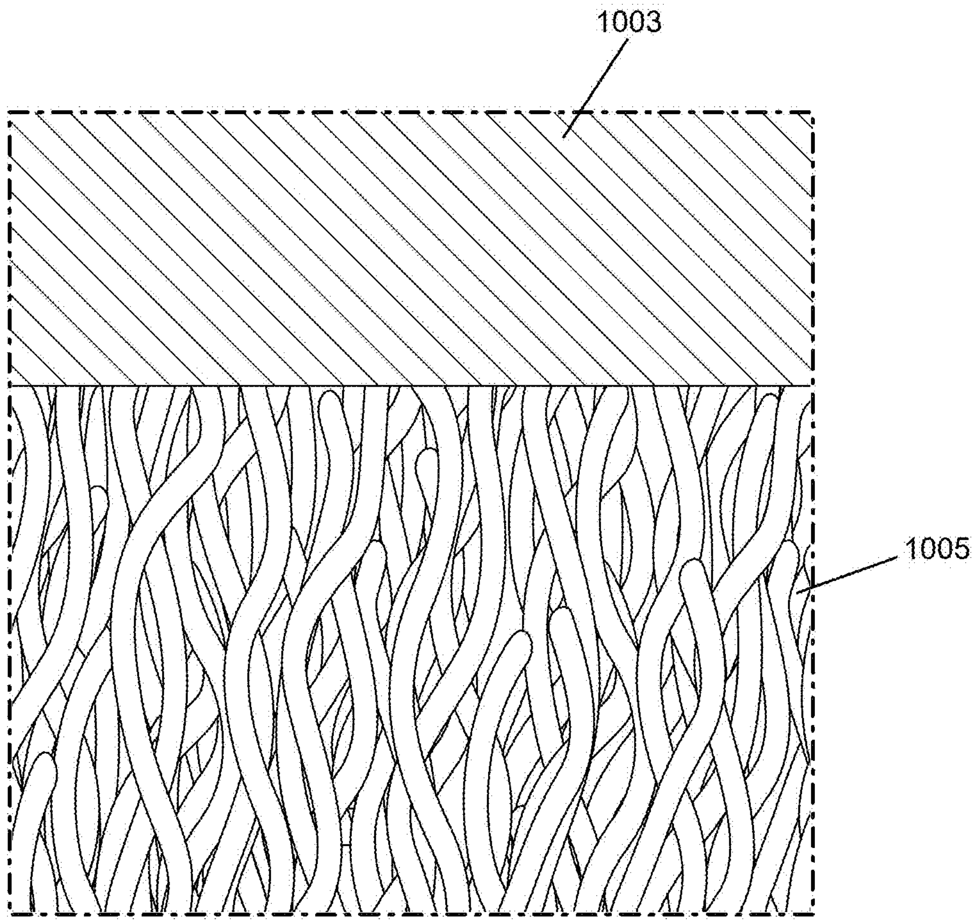
FIG. 11 is a sectional view of the current collector or substrate of FIG. 10, taken from section 11 of FIG. 10.
Figure 12:
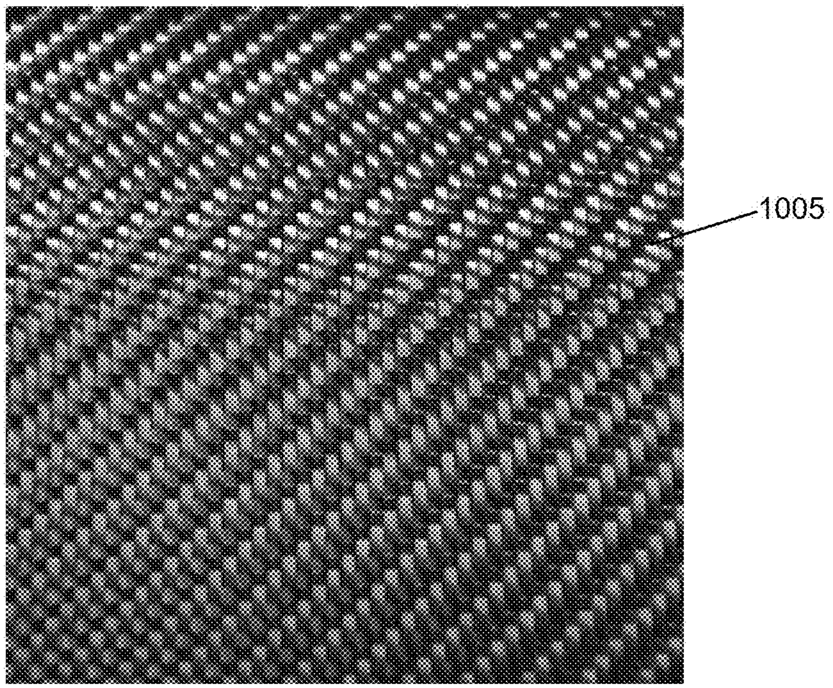
FIG. 12 is a close up cut away image of an example carbon fiber fabric which may be used with the current collector or substrate of FIGS. 9-11.
Figure 13:
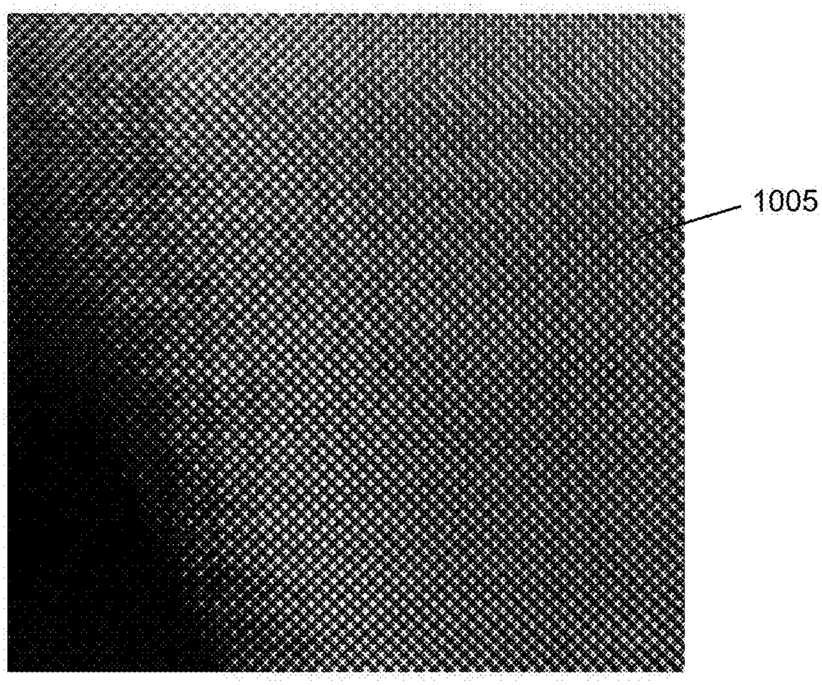
FIG. 13 is a close up cut away image of an alternative example carbon fiber fabric which may be used with the current collector or substrate of FIGS. 9-11.
Figure 14:
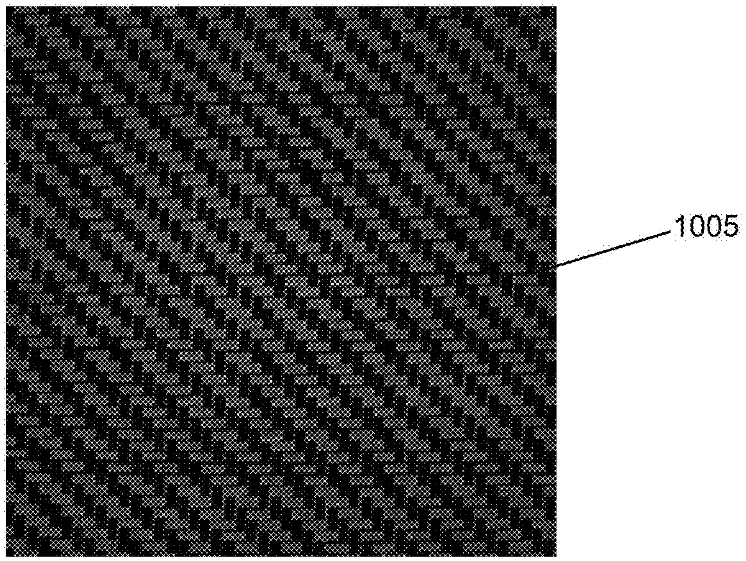
FIG. 14 is a close up cut away image of an alternative example carbon fiber fabric which may be used with the current collector or substrate of FIGS. 9-11.
Figure 16:
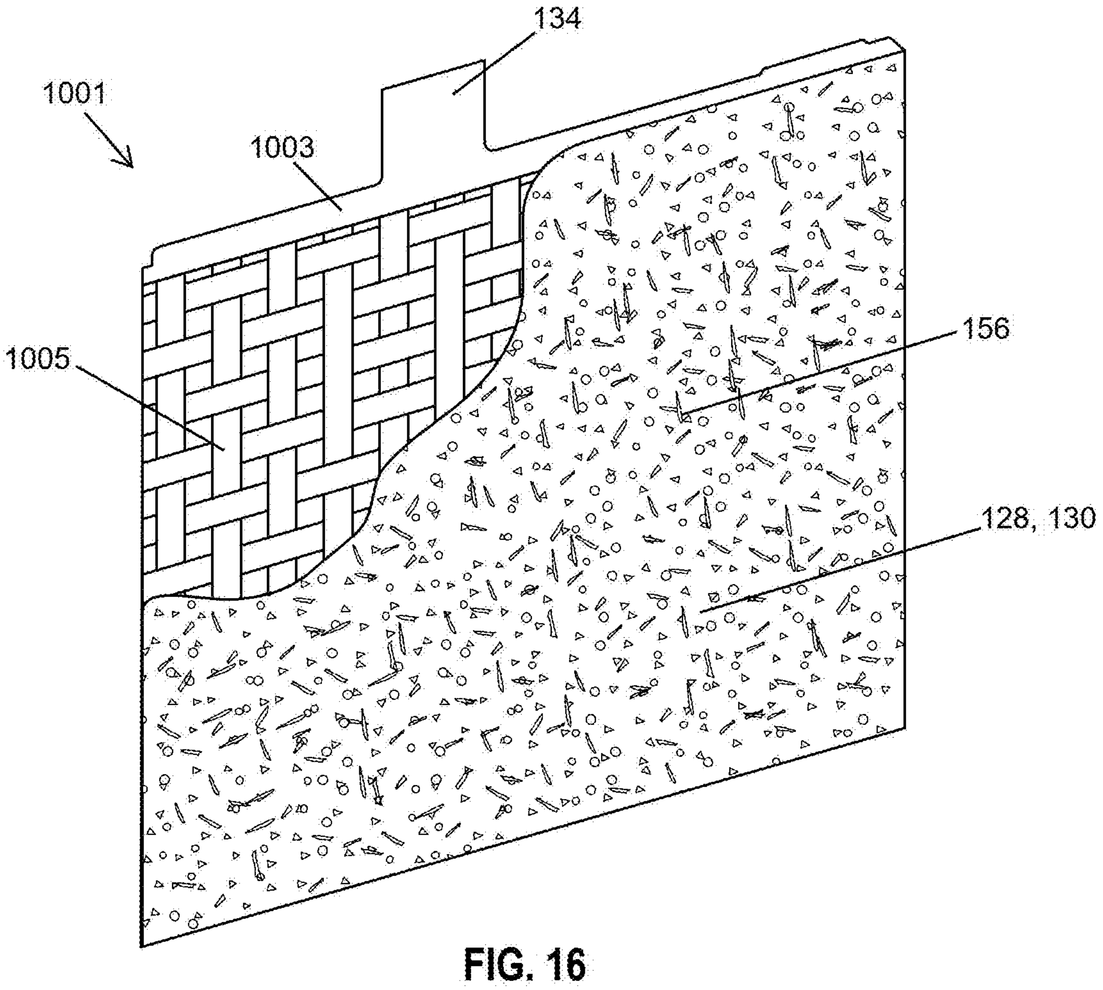
FIG. 16 is a cut away view of an alternative electrode for use with one or more examples of a lead-acid battery as described herein, showing a current collector as a fabric material having an active material thereon, the active material having the novel additive described herein and the fabric fibers shown in exaggerated woven dimensions for purposes of illustration.

However, as indicated a "grid" as used herein may include any type of mechanical support for the active material. For instance, according to one or more preferred examples of embodiments described herein at least one of the positive grid or the negative grid may comprise a fibrous material, such as a fiber mat 1005. According to one or more preferred examples of embodiments, the current collector is a conductive fibrous material forming a conductive fibrous matrix 1005. More specifically, the conductive fibrous material or conductive fibrous matrix 1005 may be a mat made of carbon or carbonized fibers. The fibers may be textile fiber material. For example, in various embodiments, the current collector may be understood to be formed from a felt-like fabric material. Accordingly, one of skill in the art will appreciate that a carbonized fiber mat 1005 may have an appearance similar to the fiber mats shown in FIGS. 12-14, and the fibers may be woven or non-woven (see FIGS. 9-12). In FIGS. 9-10 (and FIG. 16), the carbonized fibers of the mat or matrix 1005 are shown in exaggerated dimensions to illustrate the fibers and/or voids which may be present within the fiber fabric (discussed in further detail hereinbelow). The conductive fibrous matrix provides a void volume formed by voids within the fiber matrix, between the fibers. These voids may be filled by active material or paste, and/or electrolyte. The voids and fibers also provide enhanced surface area to the current collector. In one or more examples of embodiments, the conductive fiber mat 1005 may have undergone a curing step to convert the fiber mat into a stiff current collector or substrate. The conductive fibrous material may also be present in multiple layers or a single layer.

The current collector or substrate 1001 may have a strap or frame member 1003 coupled to the mat portion 1005. The strap 1003 is bonded to the top border of the fiber mat 1005. The lead alloy strap may be connected to the fiber mat or substrate by penetration into and/or between the fibers of the fibrous material. The strap 1003 extends along the edge of the current collector 1005, and preferably along the entire length of the edge of the current collector. This strap may be understood to be electrically in communication with the mat portion 1005. Accordingly, in reference to FIGS. 9-11, the current collector or substrate 1001 comprises a mat of conductive fibers 1005, e.g., carbonized fibers, affixed to a strap 1003 having a lug 134. In this regard, the lead alloy strap 1003 has a lug 134 on a top portion thereof for electrical connection within the battery 100.

The strap 1003 having a lug 134 may be formed of metal such as lead. In various embodiments, the strap or frame member 1003 may be comprised of a metal or lead alloy. Specifically, in various embodiments, the alloy may be a calcium alloy or calcium tin alloy. In various embodiments, the strap or frame member 1003 may comprise a lead-calcium alloy. In other examples of embodiments, the frame member 1003 may be a lead-calcium-tin alloy. While a lead-calcium alloy and lead-tin-calcium alloy are described, various alloys should be understood as within the scope of this disclosure. In some examples of embodiments, the lead alloy may include one or more of aluminum, tin, silver, antimony, and/or calcium. Likewise, the alloy may also include one or more impurities.

Referring to FIGS. 6-14, the substrates or grids or current collectors 124, 126, 1001 may be composed the same or similar material. It is contemplated, however, that material composition may also vary between the positive and the negative electrodes 104, 106 or current collectors. To this end, one or both of the current collectors (positive, negative, or both) may be stamped or punched fully framed grids 124, 126 having a frame 137 and a radial arrangement of grid wires 138 forming a pattern of open spaces 139 (various examples of grids 124, 126 suitable for use with the inventions described herein are shown and described in U.S. Pat. Nos. 5,582,936; 5,989,749; 6,203,948; 6,274,274; 6,953,641, 8,709,664, and 9,130,232 which are hereby incorporated by reference herein). In various embodiments, one or both current collectors (positive, negative, or both) may comprise a conductive fiber mat (e.g., current collector 1001). In some embodiments, only the positive electrode 104 may comprise a conductive fiber mat current collector 1001. In other examples of embodiments, only the negative electrode 106 may comprise a conductive fiber mat current collector 1001. Accordingly, in various examples of embodiments, the grid or substrate of the positive electrode 104 or negative electrode 106 may be a punched grid, a continuously cast (concast) grid, an expanded metal grid, a carbon or carbonized felt or fiber substrate, ceramic, and so forth. In some examples of embodiments, the grid or current collector may also include surface roughening or may be subjected to one or more different surface treatments (e.g., solvent, surfactant and/or steam cleaning), such as may be used to improve paste adhesion among other benefits. In one example of embodiments, the positive and negative current collectors may also be formed of different thickness. However, it is contemplated that the current collectors may be of the same thickness. The thickness of each current collector may be varied based upon desired manufacturing and performance parameters. For instance, thickness may be determined based upon manufacturing requirements, such as for instance, minimum requirements for paste adhesion, improved cycle performance, endurance, or other suitable parameters. While specific examples are provided for purposes of illustration, variations thereon may be made to provide grid dimensions suitable for the particular application. Likewise, while specific examples of current collector, grid, and substrate arrangements and grid or substrate types are described for purposes of example, one of skill in the art will appreciate that any grid structure or arrangement suitable for the purposes of the battery 100 may be substituted in place of the described grids/current collectors 124, 126, 1001.

As described in various embodiments herein, the positive and negative electrodes or plates 104, 106 are paste-type electrodes (FIG. 4). Thus, each plate 104, 106 comprises a current collector or grid 124, 126, 1001 pasted with electrochemically active material 128, 130 (see also FIGS. 15-16). More specifically, the paste-type electrode includes a current collector or grid which acts as a substrate and an electrochemically active material or paste is provided in contact with and/or on the substrate. The current collectors or grids 124, 126, 1001, including a positive grid and a negative grid, provide an electrical contact between the positive and negative electrochemically active materials or paste 128, 130 which may serve to conduct current. More specifically, positive paste 128 is provided in contact with and/or on the positive grid 124 and negative paste 130 is provided in contact with and/or on the negative grid 126. That is, the positive plate 104 includes a positive grid 124 having or supporting a positive electrochemically active material or paste 128 thereon, and in some examples of embodiments may include a pasting paper or a woven or non-woven sheet material comprised of fibers (e.g., a "scrim") 132; and the negative plate 106 includes a negative grid 126 having or supporting a negative electrochemically active material or paste 130 thereon, and in some examples of embodiments may include a pasting paper or scrim 132. The scrim, in one or more examples of embodiments may be composed of or include glass fibers. In other examples, the scrim may include other fiber materials, such as but not limited to polymer.

As described and shown in FIG. 10, the current collector 1001 may comprise a fiber mat portion 1005 which may comprise, for example, a plurality of carbonized fibers. In this example, the current collector may be provided with a paste and cured, forming an electrode. That is, the current collector 1001 may be understood to be impregnated with a paste and have undergone a curing step (either before or after impregnation with a paste) to produce a stiff grid.

The electrochemically active material or paste (positive and negative) may be formed of compositions including lead or leady oxide. In one or more examples, the lead may be a recycled lead. As is known, the paste or electrochemically active material (positive or negative) is oftentimes a mixture of lead and lead oxide or lead dioxide particles and dilute sulfuric acid, and may include other additives, such as carbon, barium sulfate, and/or expander such as lignosulfonate. Additives may be provided in varying amounts and combinations to the paste (positive and/or negative) suitable for the intended purposes of the battery. Alternative negative mass/paste recipes may also be provided which accomplish the objectives described herein. For example, the negative active material or paste 130 may also contain fiber and/or "expander" additives which may help maintain the active material structure and improve performance characteristics, among other things.

It is also contemplated that other materials or compositions may be present in the paste mix, such as for example, water, fibers (e.g., polymer or glass), sulfuric acid, and so forth. To this end, in a traditional lead-acid battery, a fiber material (e.g., glass, polymer, natural fiber) may be incorporated into the active material of the electrodes. Traditionally, the fiber provides a mechanical enhancement of the wet paste during fabrication, but is largely inert over the service life of the battery. In comparison, in the lead-acid battery described herein, the active mass or active material has an additive comprising an electrochemically active (not inert) fiber 156 provided in or incorporated into the active material 128 or 130 of the electrode(s) 104 or 106 (see FIGS. 15-16). In one or more examples of embodiments, the electrochemically active fiber 156 is a chopped fiber and/or may be dispersed in the active material.

In particular, the additive in one or more examples of embodiments comprises an oxidized carbon fiber. Accordingly, in one or more examples of embodiments, carbon fibers or oxidized carbon fibers 156, may be provided in the electrochemically active material 128 or 130 or paste, and in one or more preferred examples of embodiments may be provided in the negative active material. In another example of embodiments, oxidized polyacrilonitrile (PAN) fibers 156 may be provided or incorporated into the active material 128 or 130 or paste which is carried by the substrate or grid 124 or 126 or 1001. PAN fibers are electrochemically compatible and may be beneficial within a lead-acid battery system. In some examples, the additive fibers 156 may comprise a mixture of PAN fibers and carbon fibers and/or oxidized carbon fibers.

In one example of embodiments, the fibers 156 described above may be chopped fibers that are introduced or dispersed into the active material. The fibers 156 may be provided in a variety of concentrations or amounts, which a dosage of the material or dosage level ranging from 0.1 weight percent (wt %) to 5 weight percent (wt %) of fiber 156 in the electrode, and in some examples of embodiments more specifically ranging from 0.2 weight percent (wt %) to 2 weight percent (wt %). Weight percent is defined herein as weight percent (wt %) of the leady oxide. These amounts or concentrations provide various technical effects and advantages over batteries which do not include such amounts in the leady oxide as described in further detail herein.

For example, in addition to the processability enhancement referenced above gained by the addition of a fiber material to the active material or active mass, the additive fiber 156 described herein is electrochemically active and imparts improved electrochemical properties to the electrode during operation, including enhanced conductivity, capacitance, pore modification, passivization resistance, and so forth.

Accordingly, in one or more examples of embodiments, electrochemically active fibers 156 may be provided in the electrochemically active material 128 or 130 or paste or mass.

Accordingly, the positive electrode or plate 104 may contain a substrate or grid 124 or 1001 with lead dioxide active material or paste 128 thereon or in contact therewith. The negative electrode or plate 106 may be composed of a substrate or grid 126 or 1001 with a spongy lead active material or paste 130 thereon or in contact therewith. The negative paste 130 may, in a preferred embodiment, be substantially similar to the positive paste 128 but may also vary. For example, the negative paste 130 may comprise an oxidized carbon fiber additive 156. In some examples of embodiments, the electrode comprises a grid 124 or 126 having active material 128 or 130 including the oxidized carbon fiber described herein in the active material or mass. For example, the negative electrode may comprise a grid 126 having negative active mass or material 130 thereon which active mass or material includes oxidized carbon fibers interspersed therein. In other examples of embodiments, the electrode comprises a current collector 1001 formed of a carbonized mat having active material 128 or 130 including the oxidized carbon fiber described herein in the active material or mass. For example, the negative electrode may comprise a current collector 1001 having negative active mass or material 130 impregnated therein which active mass or material also includes oxidized carbon fibers interspersed therein. It is contemplated that different materials may be used in connection with the lead-containing paste composition without limiting the objectives described herein, with the present invention not being restricted to any particular materials or mixtures. These materials may be employed alone or in combination as determined by numerous factors, including for example, the intended use of the battery 100 and the other materials employed in the battery.

Figure 5:
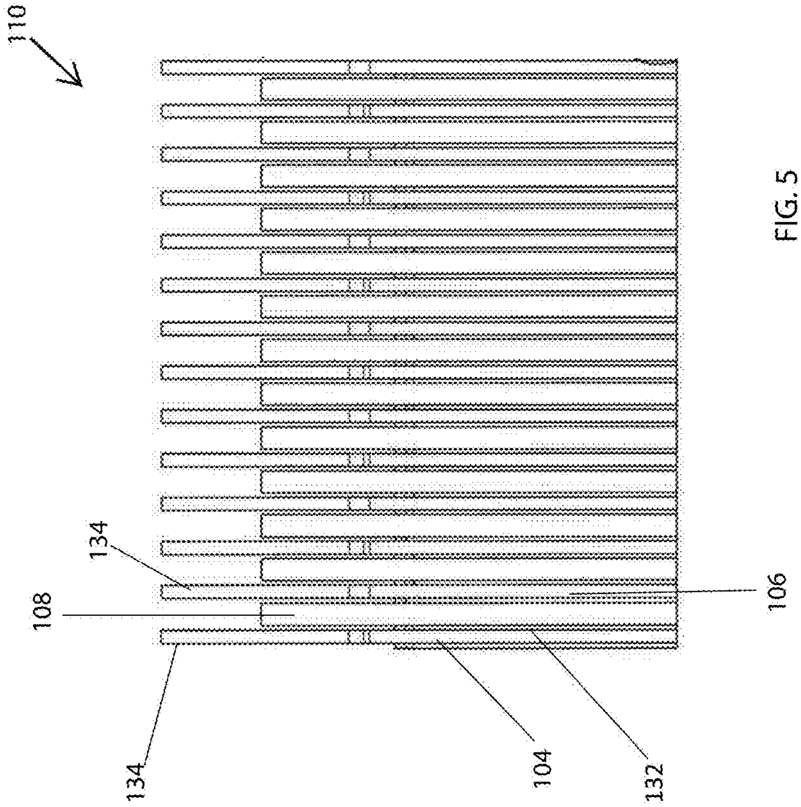
FIG. 5 is a partial, side elevation view of a cell element according to one or more examples of embodiments for use with the lead-acid battery shown in FIGS. 2-4.
Figure 7:
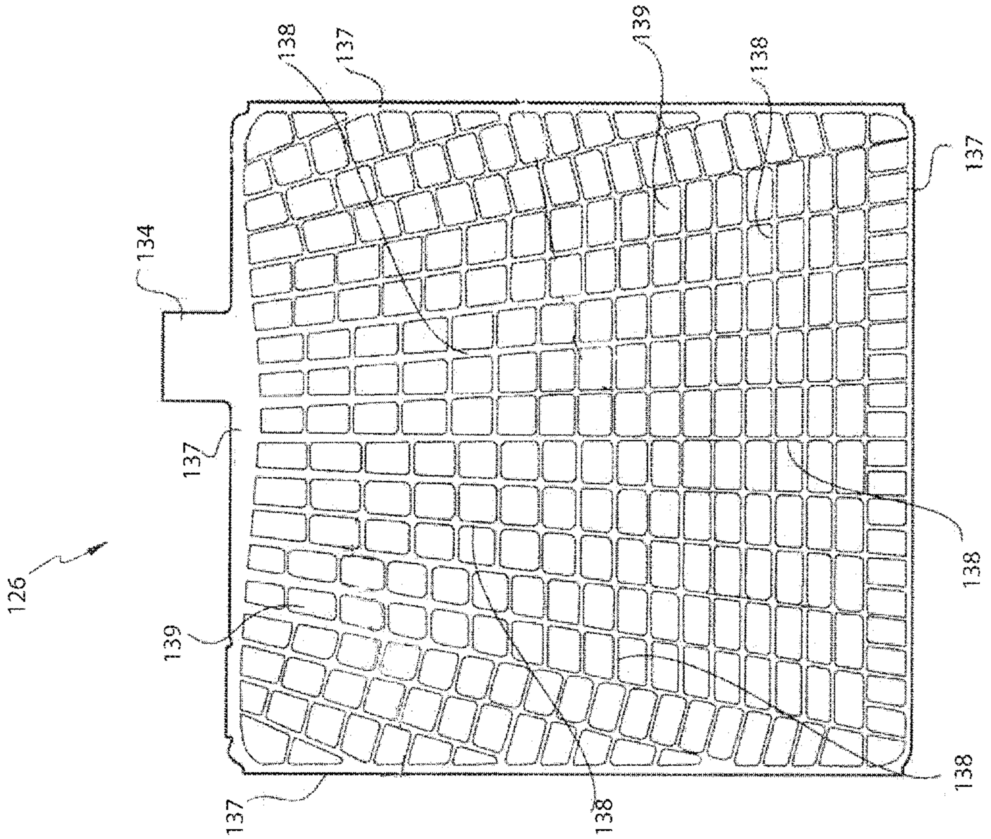
FIG. 7 is an additional elevation view of an example battery grid or substrate or current collector for use with the lead-acid battery shown in FIGS. 2-4.
Figure 6:
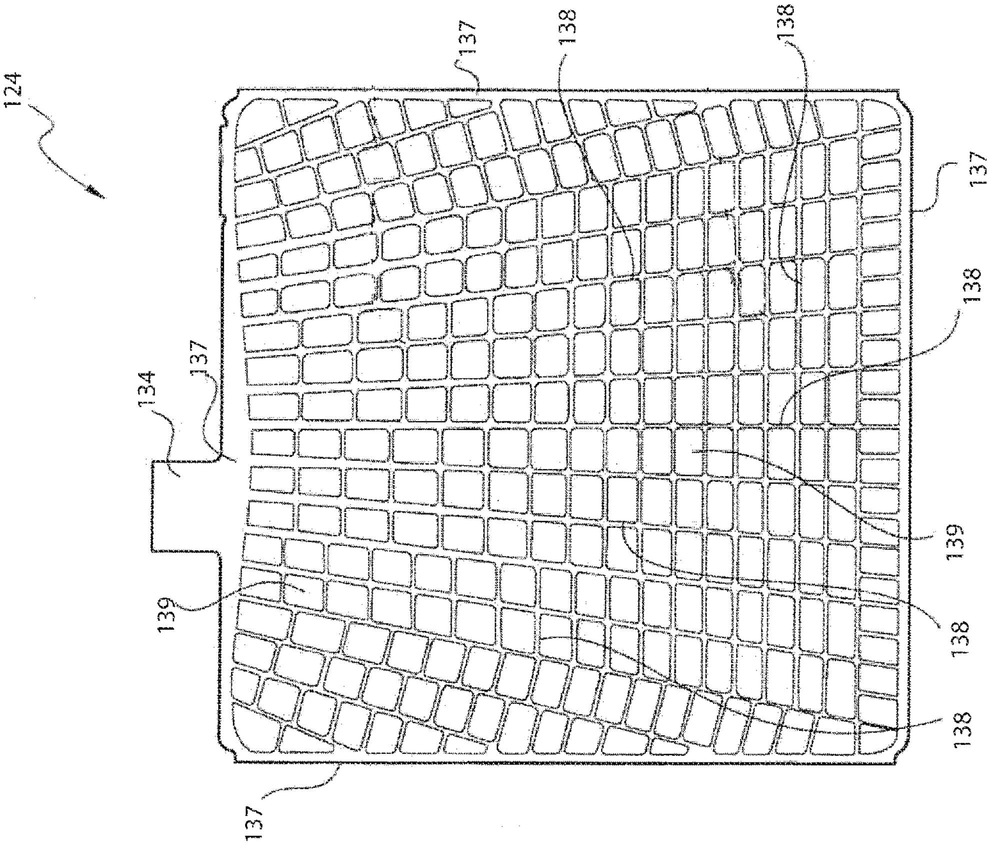
FIG. 6 is an elevation view of an example battery grid or substrate or current collector for use with the lead-acid battery shown in FIGS. 2-4.
Figure 8:
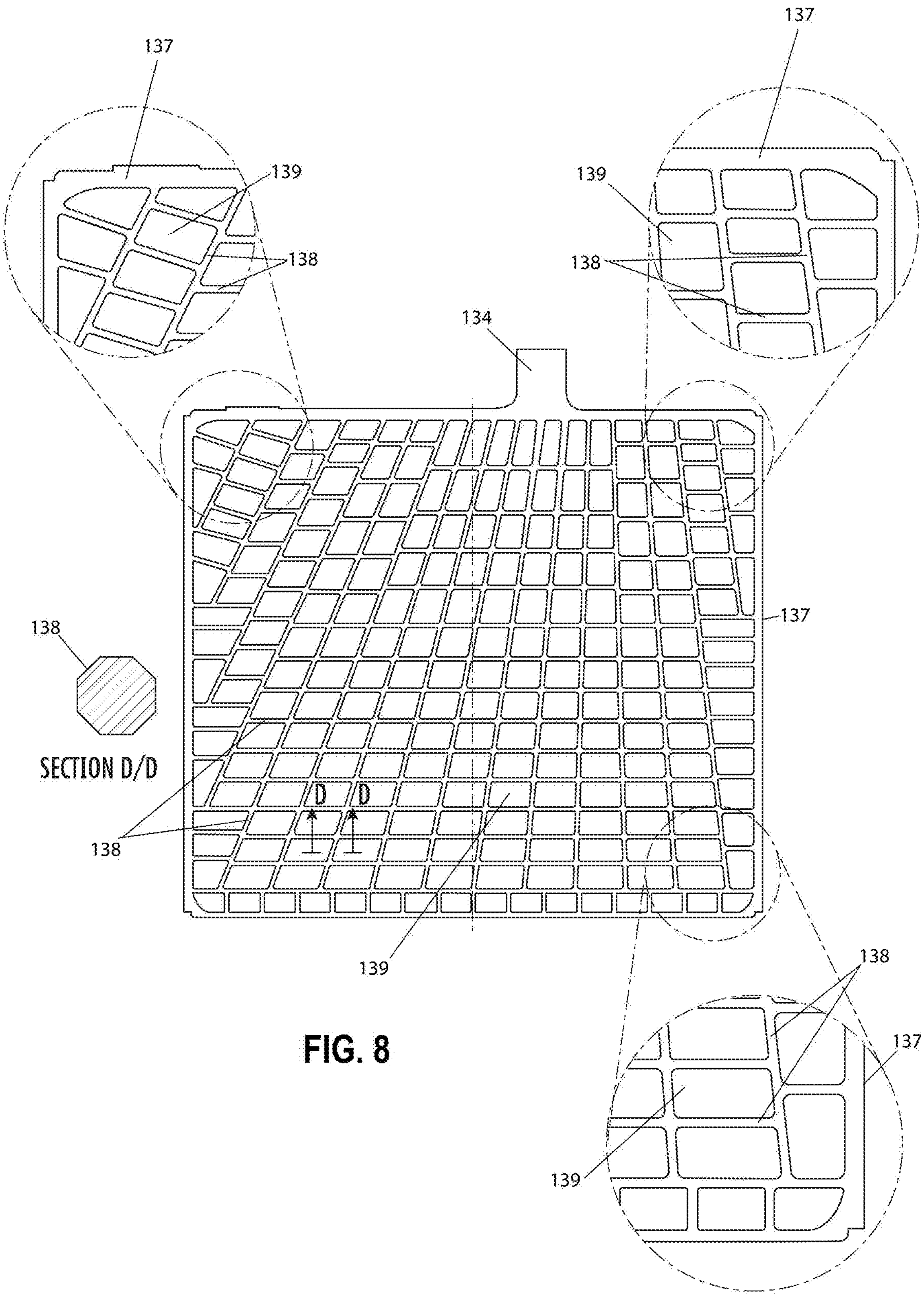
FIG. 8 is an elevation view of an alternative example battery grid or substrate or current collector for use with the lead-acid battery shown in FIGS. 2-4, showing section details of the illustrated grid.
Figure 15:
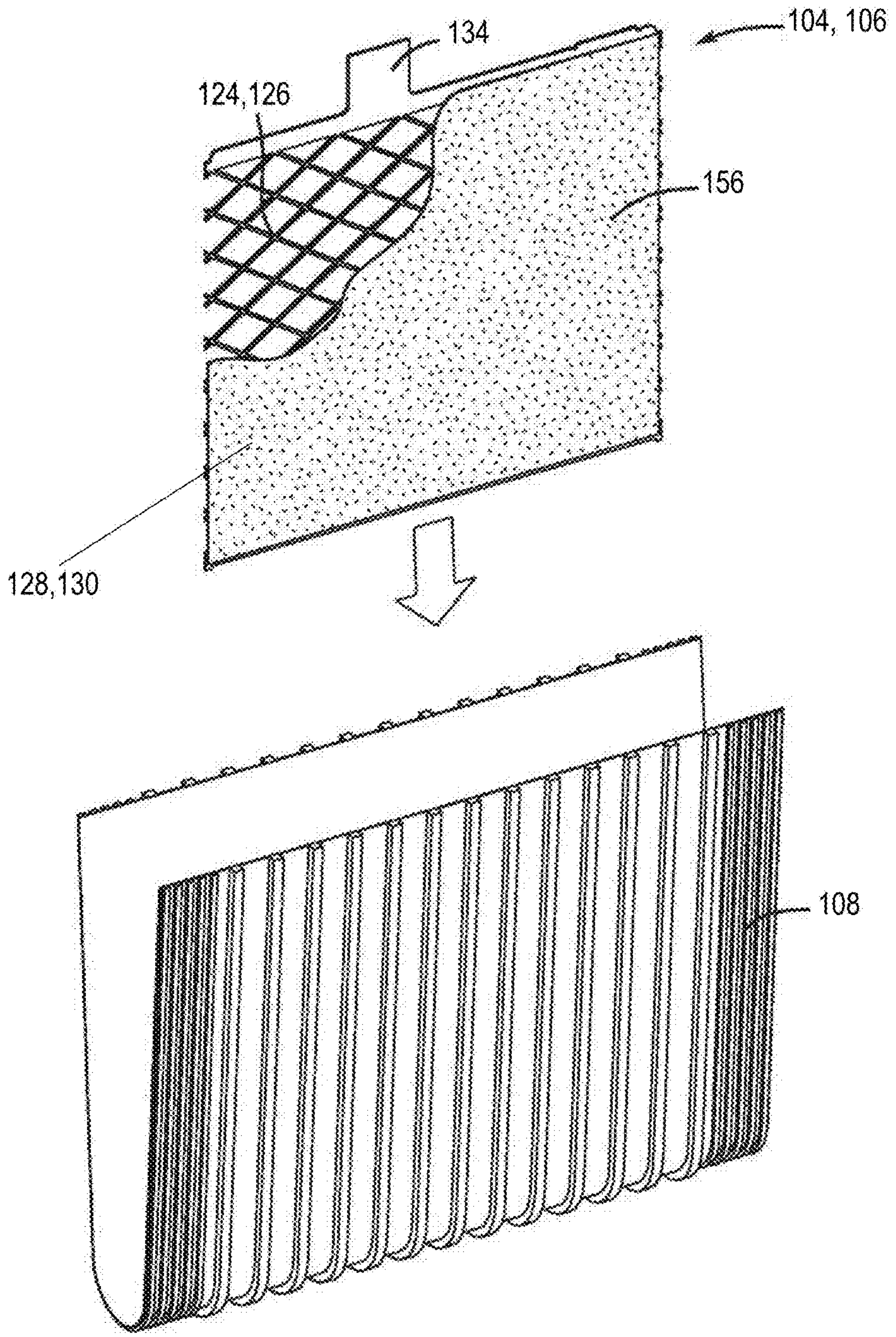
FIG. 15 is a partially exploded, cut away view of an electrode for use with one or more examples of a lead-acid battery as described herein, showing a grid having an active material thereon and a separator, the active material having the novel additive described herein.

As indicated, positioned between the positive and negative electrodes or plates 104, 106 is a separator 108 (see FIGS. 4-5, 15). An AGM lead-acid battery has positive and negative electrodes or plates 104, 106 which are separated by an absorbent glass mat 108 that absorbs and holds the battery's acid or electrolyte and prevents it from flowing freely inside the battery 100. To this end, the separator 108 may be a porous and absorbent glass mat (AGM). The working electrolyte saturation is at some value below 100% saturation to allow recombinant reactions of hydrogen and oxygen. In some examples, the absorbent glass mat 108 may also be used with an additional separator (not shown); various common commercially available separators are known in the art. The separator may be a "U-shape" wrapping the plate or electrode, but the separator or AGM can be a single sheet or, for example, can be a single length concertina with plates separated by 2 layers. Accordingly, in various embodiments, the electrode including the current collector, e.g., current collector 1001, may further be wrapped in or interleaved with a separator. A single or double layer of separator 108 may be employed. For example, a separator may be provided on the positive plate 104 and an AGM 108 may also be employed with the positive/negative plates 104, 106.

An electrolyte, which is typically sulfuric acid, may be included in the battery 100. In various examples, the electrolyte may include one or more metal ions. To this end, the sulfuric acid electrolyte may be a sulfuric acid solution including one or more metal sulfates.

Accordingly, as described above a lead-acid battery is provided. The battery comprises a container with a cover having one or more compartments. One or more cell elements are provided in the one or more compartments. The cell elements comprise a positive electrode and a negative electrode. The positive electrode has a positive current collector and a positive electrochemically active material in contact therewith. The negative electrode has a negative current collector and a negative electrochemically active material in contact therewith. The electrochemically active material of at least one of the positive electrochemically active material and the negative electrochemically active material includes electrochemically active fibers therein. At least one of the positive electrode or the negative electrode may comprise a cured carbon or carbonized fiber mat current collector impregnated with the respective electrochemically active material. Electrolyte is provided within the container. One or more terminal posts extend from the container or the cover and are electrically coupled to the cell elements.

An electrode for a lead-acid battery is also provided. The electrode includes electrochemically active fiber dispersed in active material which is carried by the electrode. The electrochemically active fiber may be a chopped electrochemically active fiber. The fiber may further be an oxidized fiber. The electrode may be a negative electrode and the active material may be negative active material. The electrode may also comprise a cured carbon or carbonized fiber mat current collector impregnated with the electrochemically active material and a frame member composed of a lead-calcium alloy.

A lead-acid battery and an electrode formed with the additive as described herein has various advantages. For example, the addition of an electrochemically active fiber, such as an oxidized carbon or PAN fiber, provides advantages of improved performance, including charge acceptance, among other performance characteristics in a lead-acid battery. The addition of electrochemically active fibers in the electrochemically active material imparts improved electrochemical properties to the electrode during operation, including enhanced conductivity, capacitance, pore modification, passivization resistance, and so forth. In one particular example, namely micro-hybrid vehicles, lead-acid batteries must operate in a partial state of charge between idle-stop-start or regenerative braking events. The active material additive described herein enhances charge acceptance, thereby allowing batteries to meet the requirements of high charge acceptance over the life of the battery, without excessive water loss through electrolysis of the sulfuric acid electrolyte.

EXAMPLES

The following Examples are an illustration of one or more examples of embodiments of carrying out the invention and are not intended as to limit the scope of the invention. The lead-acid battery 100 described herein may have one or more of the following characteristics.

Example 1

One or more examples of a lead-acid battery 100 described herein having oxidized carbon fiber added to negative active material were tested against a control.

More specifically, in one or more examples of embodiments, one or more negative electrodes from a control were measured for density, penetration, and moisture content. The control had a paste density of approximately 4.6 g/cm3; a penetration of approximately 330$1/10^{th}$ mm (measured by Humboldt penetrometer); and a moisture content of approximately 11.00 percent in the wet active mass. One or more negative electrodes of the type described herein having an oxidized carbon fiber added to the negative active material were also measured. The negative electrodes had a paste density of approximately 4.4 g/cm3; a penetration of 200$1/10^{th}$ (measured by Humbolt penetrometer); and a moisture content of approximately 10.75 percent in the wet active mass.

The foregoing measurements demonstrate that the presence of oxidized carbon fiber in the negative active material lowered the paste density. The measurements, namely penetration results, also demonstrate that the oxidized carbon fiber produces a stiffer paste. Lastly, the moisture content in the wet active mass remained within normal tolerance.

Example 2

One or more examples of embodiments of a lead-acid battery having oxidized carbon fiber added to the negative active material were also tested against a control to evaluate Reserve Capacity (RC) and 20 hour Capacity (C20).

In the illustrated example, lead-acid batteries were constructed, including controls and batteries having oxidized carbon fiber added to/dispersed in the negative active material as described herein. The batteries were constructed the same, having the same content, but for the addition of oxidized carbon fiber in batteries to be tested against the control. The results are displayed in FIGS. 17-18.

Figure 17:
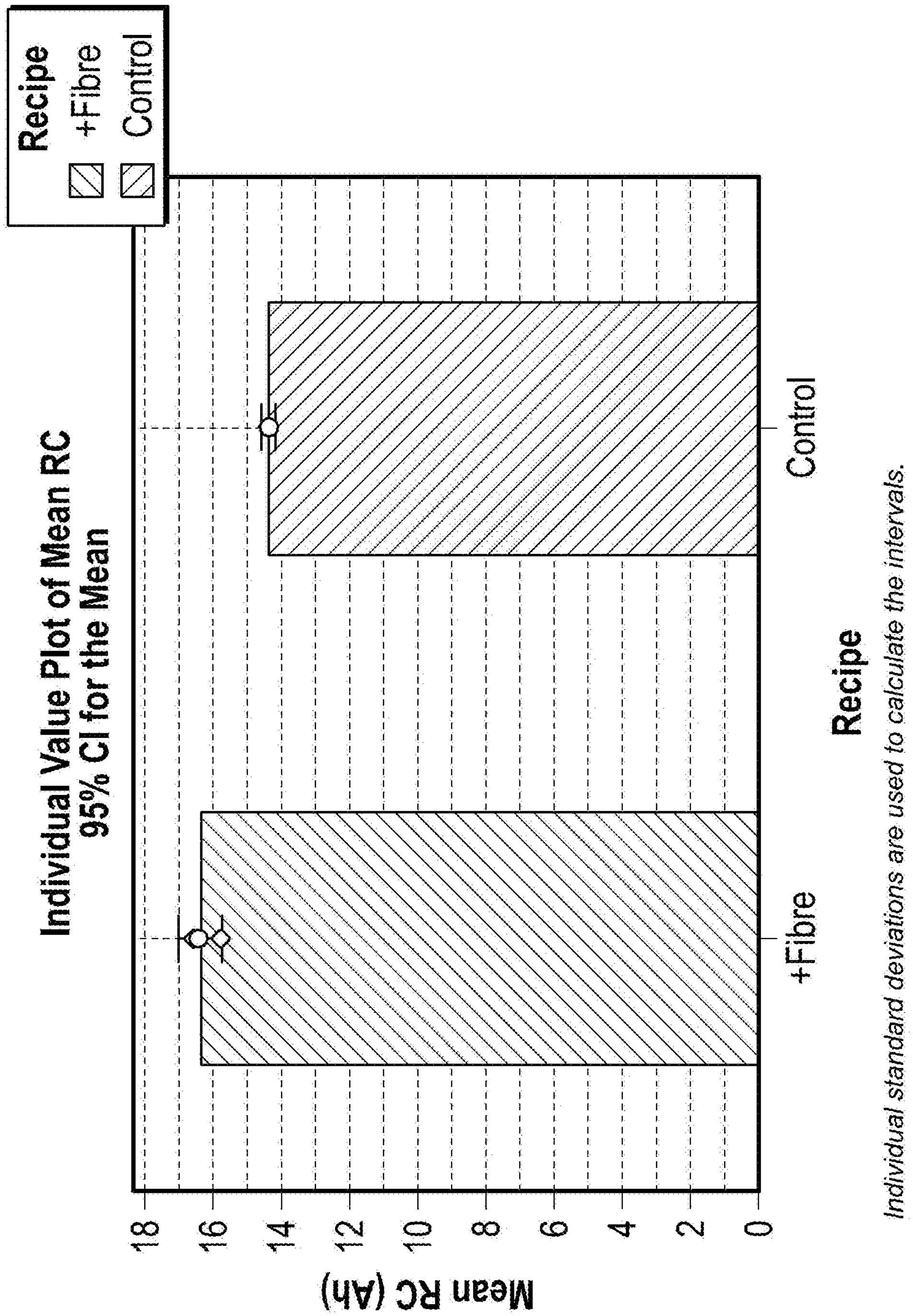
FIG. 17 is a graph illustrating test results, namely an Individual Value Plot of Mean RC, 95% CI for the Mean, for lead-acid batteries having oxidized carbon fiber added to the negative active material compared to a control.

FIG. 17 illustrates an Individual Value Plot of Mean RC (reserve capacity), 95% CI for the Mean. In FIG. 17 the negative active material recipes, both with and without fiber, are plotted against mean RC (Ah). As can be seen, the battery having oxidized carbon fiber in the negative active material or paste had a higher mean reserve capacity (RC) as compared to the control, namely a reserve capacity between approximately 15.5 Amp hours (Ah) and 17 Amp hours (Ah), and in some examples a mean slightly greater than 16 Amp hours (Ah). The control exhibited a reserve capacity of between approximately 14 Amp hours (Ah) and 14.9 Amp hours (Ah), and in some examples a mean slightly greater than 14 Amp hours (Ah). Accordingly, batteries having oxidized carbon fiber in the negative paste exhibited improved reserve capacity (RC) over the standard or control lead-acid battery, and in particular an increase or difference of nearly 2 Amp hours (Ah) (i.e., a greater than 10% difference).

Figure 18:
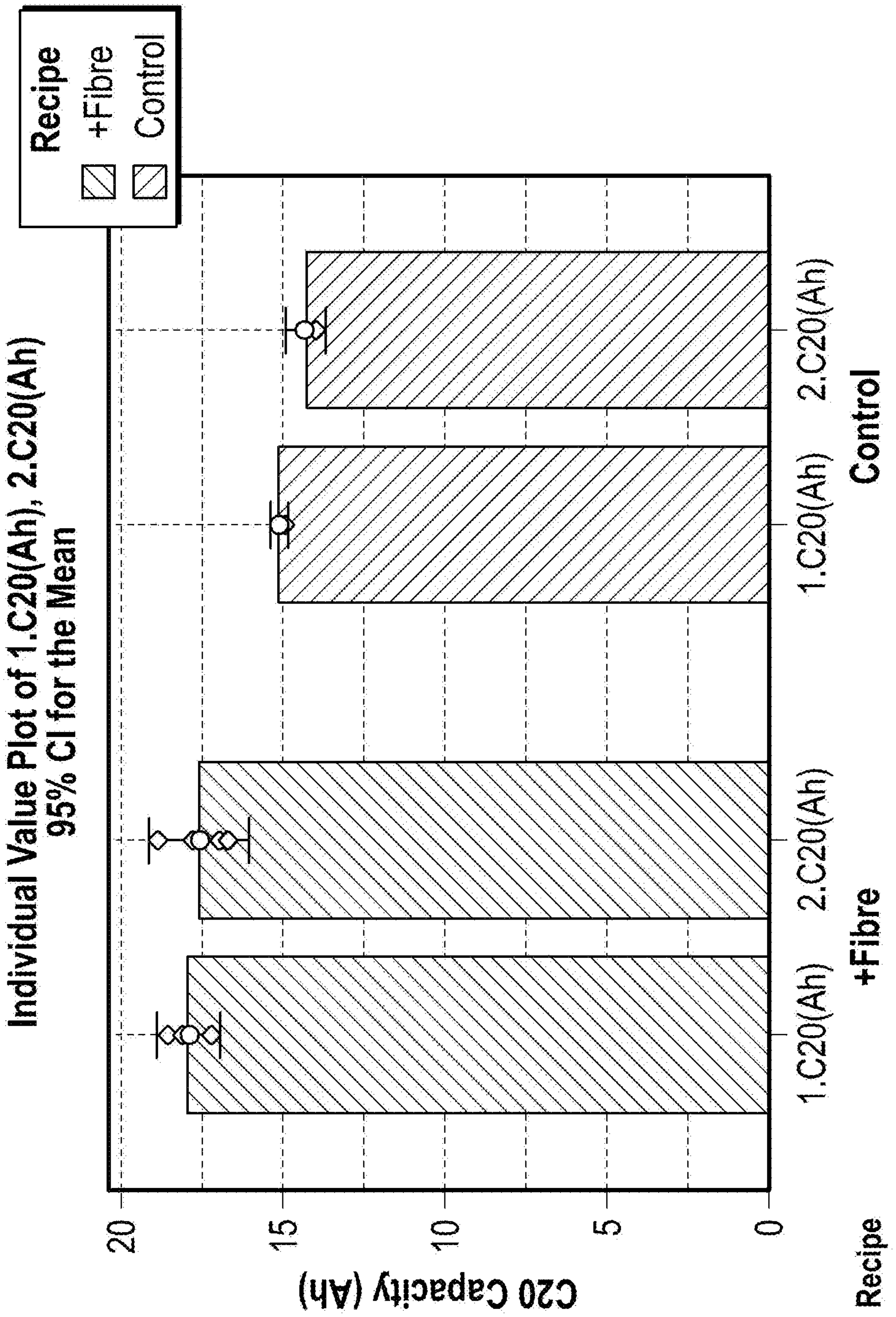
FIG. 18 is a graph illustrating test results, namely an Individual Value Plot of 1.C20(Ah), 2.20(Ah), 95% CI for the Mean, for lead-acid batteries having oxidized carbon fiber added to the negative active material compared to a control.

FIG. 18 illustrates an Individual Value Plot of 1.C20(Ah), 2.20(Ah), 95% CI for the Mean. In FIG. 18 lead-acid batteries having negative active material recipes, both with and without fiber, are plotted against C20 Capacity (Ah) for two C20 tests. (Note: C20 is 20 hour capacity.) As can be seen, the battery having oxidized carbon fiber in the negative active material or paste had a C20 capacity of between approximately 17 Amp hours (Ah) and approximately 19 Amp hours (Ab), and in some examples a mean slightly greater than approximately 17.5 Amp hours (Ah) in a first test; and between approximately 16 Amp hours (Ah) and approximately 19 Amp hours (Ah), and in some examples a mean of approximately 17.5 Amp hours (Ah) in a second test. The control (without oxidized carbon fiber) had a C20 capacity of between approximately 14.5 Amp hours (Ah) and approximately 15.5 Amp hours (Ah), and in some examples a mean of approximately 15 Amp hours (Ah) in a first test; and between approximately 14 Amp hours (Ah) and approximately 15 Amp hours (Ab), and in some examples had a mean slightly below 15 Amp hours (Ah) in a second test. Accordingly, batteries having oxidized carbon fiber in the negative paste exhibited improved 20 hour capacity (C20) over the standard or control lead-acid battery, and in particular an increase or difference of approximately 2.5 Amp hours (Ah) (i.e., greater than 15% difference).

Example 3

One or more examples of embodiments of a lead-acid battery having oxidized carbon fiber added to the negative active material were also tested against a control to evaluate charge acceptance, including Discharge-in Charge Acceptance and Charge-in Charge Acceptance.

In the illustrated example, lead-acid batteries were constructed, including controls and batteries having oxidized carbon fiber added to/dispersed in the negative active material as described herein. The batteries were constructed the same, having the same content, but for the addition of oxidized carbon fiber in the batteries to be tested against the control. The results are displayed in FIGS. 19-20.

Figure 19:
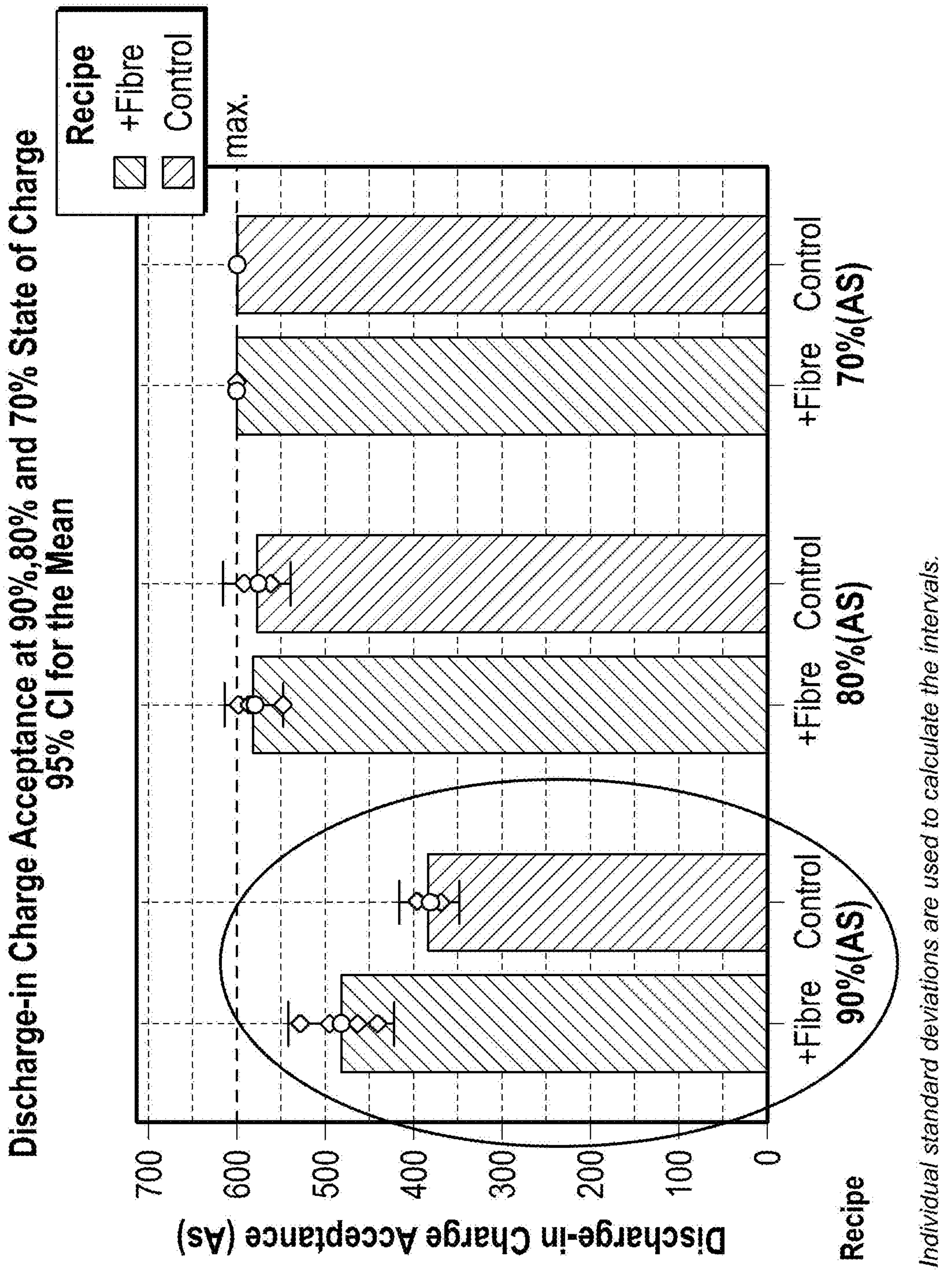
FIG. 19 is a graph illustrating test results, namely Discharge-in Charge Acceptance at 90%, 80% and 70% State of Charge, 95% CI for the Mean, for lead-acid batteries having oxidized carbon fiber added to the negative active material compared to a control.

In FIG. 19, Discharge-in Charge Acceptance at 90%, 80% and 70% State of Charge, 95% CI for the Mean is shown. In FIG. 19 lead-acid batteries having negative active material recipes, with and without fiber, are plotted against Discharge-in Charge Acceptance (As) at 90%, 80%, and 70% State of Charge. At 90% (ninety percent) State of Charge the battery having oxidized carbon fiber added to the negative active material had a Discharge-in Charge Acceptance (As) ranging from approximately 425 (As) to approximately 550 (As), and in some examples had a mean Discharge-in Charge Acceptance (As) of approximately 475 (As). At 90% (ninety percent) State of Charge the control battery without oxidized carbon fiber added to the negative active material had a Discharge-in Charge Acceptance (As)ranging from approximately 350 (As) to approximately 425 (As), and in some examples had a mean Discharge-in Charge Acceptance (As) of approximately 375 (As). At 80% (eighty percent) State of Charge the battery having oxidized carbon fiber added to the negative active material had a Discharge-in Charge Acceptance (As) ranging from approximately 550 (As) to approximately 625 (As) (or a maximum of approximately 600 (As)), and in some examples had a mean Discharge-in Charge Acceptance (As) of approximately 575 (As). At 80% (eighty percent) State of Charge the control battery without oxidized carbon fiber added to the negative active material had a Discharge-in Charge Acceptance (As) ranging from approximately 550 (As) to approximately 625 (As) (or a maximum of approximately 600 (As)), and in some examples had a mean Discharge-in Charge Acceptance (As) of approximately 575 (As). At 70% (seventy percent) State of Charge the battery having oxidized carbon fiber added to the negative active material and the control each had a Discharge-in Charge Acceptance (As) of approximately 600 (As), the maximum charge acceptance.

Accordingly, the battery having oxidized carbon fiber added to the negative active material had a Discharge-in Charge Acceptance (As) which was improved over the control or standard battery. In the illustrated example, the battery having oxidized carbon fiber added to the negative active material had a Discharge-in Charge Acceptance (As) which was approximately 100 (As) over the control or standard battery (i.e., an approximately 25% difference) at the higher state of charge, namely 90% State of Charge.

Figure 20:
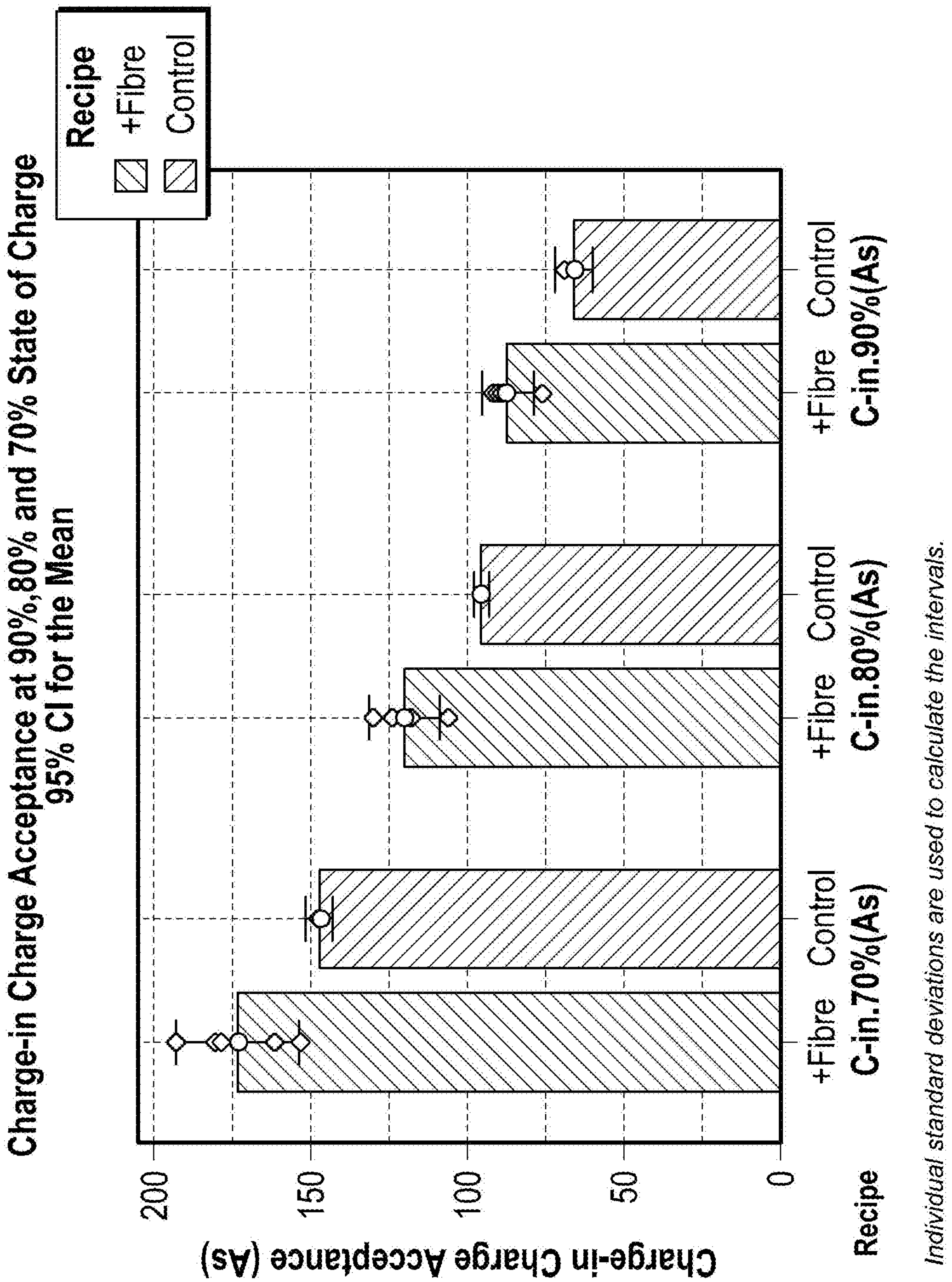
FIG. 20 is a graph illustrating test results, namely Charge-in Charge Acceptance at 90%, 80% and 70% State of Charge, 95% CI for the Mean, for lead-acid batteries having oxidized carbon fiber added to the negative active material compared to a control.

In FIG. 20 Charge-in Charge Acceptance at 90%, 80% and 70% State of Charge, 95% CI for the Mean is shown. In FIG. 20 lead-acid batteries having negative active material recipes, with and without fiber, are plotted against Charge-in Charge Acceptance (As) at 70%, 80%, and 90% State of Charge. At 70% (seventy percent) State of Charge the battery having oxidized carbon fiber added to the negative active material had a Charge-in Charge Acceptance (As) ranging from approximately 150 (As) to approximately 190 (As), and in some examples had a mean Charge-in Charge Acceptance (As) of approximately 175 (As). At 70% (seventy percent) State of Charge the control battery without oxidized carbon fiber added to the negative active material had a Charge-in Charge Acceptance (As) ranging from approximately 140 (As) to approximately 150 (As), and in some examples had a mean Charge-in Charge Acceptance (As) of approximately 145 (As). At 80% (eighty percent) State of Charge the battery having oxidized carbon fiber added to the negative active material had a Charge-in Charge Acceptance (As) ranging from approximately 115 (As) to approximately 135 (As), and in some examples had a mean Charge-in Charge Acceptance (As) of approximately 120 (As). At 80% (eighty percent) State of Charge the control battery without oxidized carbon fiber added to the negative active material had a Charge-in Charge Acceptance (As) ranging from approximately 90 (As) to approximately 100 (As), and in some examples had a mean Charge-in Charge Acceptance (As) of approximately 95 (As). At 90% (ninety percent) State of Charge the battery having oxidized carbon fiber added to the negative active material had a Charge-in Charge Acceptance (As) ranging from approximately 80 (As) to approximately 95 (As), and in some examples had a mean Charge-in Charge Acceptance (As) of approximately 85 (As). At 90% (ninety percent) State of Charge the control battery without oxidized carbon fiber added to the negative active material had a Charge-in Charge Acceptance (As) ranging from approximately 60 (As) to approximately 75 (As), and in some examples had a mean Charge-in Charge Acceptance (As) of approximately 65 (As).

Accordingly, the battery having oxidized carbon fiber added to the negative active material had a Charge-in Charge Acceptance (As) which was approximately 25 (As) greater than the control or standard battery at each State of Charge.

In view of the foregoing, the battery having oxidized carbon fiber added to the negative active material has an improved charge acceptance, particularly at higher states of charge.

While specific examples are shown, one of skill in the art will recognize that these are examples only and variations thereon may be made without departing from the overall scope of the present invention.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., “top” and “bottom”) in this description are merely used to identify various elements as are oriented in the Figures. It should be recognized that the orientation of particular components may vary greatly depending on the application in which they are used.

For the purpose of this disclosure, the term “coupled” means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art.

Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

We claim:

1. An electrode for a lead-acid battery comprising:

a current collector;

an electrochemically active fiber, with the electrochemically active fiber being an oxidized polyacrylonitrile (PAN) fiber, dispersed in an active material at an amount of 2.25-5 weight percent of the active material for an increased capacitance of the active material compared to an active material having less than the amount of the electrochemically active fiber, with the active material being carried by the current collector;

the current collector being a cured carbon or carbonized fiber mat current collector impregnated with the active material; and the electrode having a penetration of 200 1/10th mm measured by a Humboldt penetrometer and a moisture content of approximately 10.75 percent in the active material.

2. The electrode of claim 1, wherein the electrochemically active fiber is a chopped electrochemically active fiber.

3. The electrode of claim 1, wherein the electrode is a negative electrode and the active material is a negative active material.

4. The electrode of claim 1, wherein the electrode comprises a frame member composed of a lead-calcium alloy.

5. A battery comprising the electrode of claim 1.

6. The electrode of claim 4, wherein the frame member comprises a strap bonded to the cured carbon or carbonized fiber mat.

7. The electrode of claim 4, wherein the frame member comprises a lug.

8. A lead-acid battery comprising:

a container with a cover, the container having one or more compartments;

one or more cell elements are provided in the one or more compartments, the one or more cell elements comprising a positive electrode and a negative electrode, with at least one of the positive electrode or the negative electrode being the electrode of claim 1, the positive electrode having a positive current collector and a positive electrochemically active material in contact with the positive current collector, the negative electrode having a negative current collector and a negative electrochemically active material in contact with the negative current collector;

electrolyte provided within the container; and one or more terminal posts extending from the container or the cover and electrically coupled to the one or more cell elements.

9. The lead-acid battery of claim 8, wherein the cured carbon or carbonized fiber mat current collector comprises a frame member composed of a lead-calcium alloy.

10. The lead-acid battery of claim 9, wherein the frame member comprises a strap bonded to the cured carbon or carbonized fiber mat.

11. The lead-acid battery of claim 10, wherein the frame member comprises a lug.

12. The lead-acid battery of claim 1, wherein at least one of the positive electrode or the negative electrode is a grid composed of a lead material.

13. The lead-acid battery of claim 8, wherein the one or more cell elements further comprise a separator.

14. The lead-acid battery of claim 13, wherein the separator is an absorbent glass mat.

15. The lead-acid battery of claim 8, wherein the electrochemically active fiber is added to the negative electrochemically active material.

16. The lead-acid battery of claim 8, wherein the electrochemically active fiber is chopped fiber.

* * * * *